April 27, 1965  C. F. PAVLIN  3,180,360
COMPENSATED VALVE
Filed June 7, 1962  3 Sheets-Sheet 3

Inventor
Cyrille Francois Pavlin
By Stevens, Davis, Miller + Mosher
Attorneys

United States Patent Office 3,180,360
Patented Apr. 27, 1965

3,180,360
COMPENSATED VALVE
Cyrille François Pavlin, Cormeilles en Parisis, France, assignor to Société Bertin et Cie., Paris, France, a company of France
Filed June 7, 1962, Ser. No. 200,862
Claims priority, application France, June 13, 1961, 864,750
4 Claims. (Cl. 137—625.5)

This invention relates to the regulation, in obedience to a determinate law, of the rate of flow in high pressure gas circuits wherein the temperature may likewise be high (in excess of 1000° C.). The invention has for its object to provide a valve which permits the obtainment of rapid variations in large fluid flows, using a control force which may be substantially constant or vary only slightly in terms of the rate of flow. This control force furthermore has a relatively low value.

A valve unit according to this invention comprises, in combination, a valve proper which is movable along the axis of a convergent or divergent nozzle disposed at the fluid inlet and terminating within an intermediate space having an outlet orifice of constricted section such that the pressure prevailing in said intermediate space be greater than the pressure delivered downstream of said orifice, and a piston which extends from said valve coaxially and is rigid therewith and which slides, in conjunction with the use of convenient sealing devices, within a cylinder embodied in the wall of the valve unit, said piston being acted on one of its faces by the pressure in said intermediate space. The area of the piston is such that the thrust it sustains due to the pressure prevailing in said intermediate space, added to the force resulting from the pressures acting on the valve, gives a substantially constant resultant force, irrespective of the position of the valve-piston assembly in the body of the valve unit. The substantially constant resultant force applied to the valve-piston assembly can be balanced very easily, for instance by means of a constant pressure applied against the other face of the piston. It will be noted that the piston acts as a compensating piston by virtue of one of its faces being in contact with the fluid while it acts as a balancing piston by virtue of its other face being acted upon by a balancing force means (not shown).

The description which follows with reference to the accompanying drawings, which are filed by way of example only and not of limitation, will give a clear understanding of the various features of this invention and of the art of carrying them into practice, such specific dispositions as emerge either from the description or the drawings naturally falling within the scope of the invention.

Figure 1:
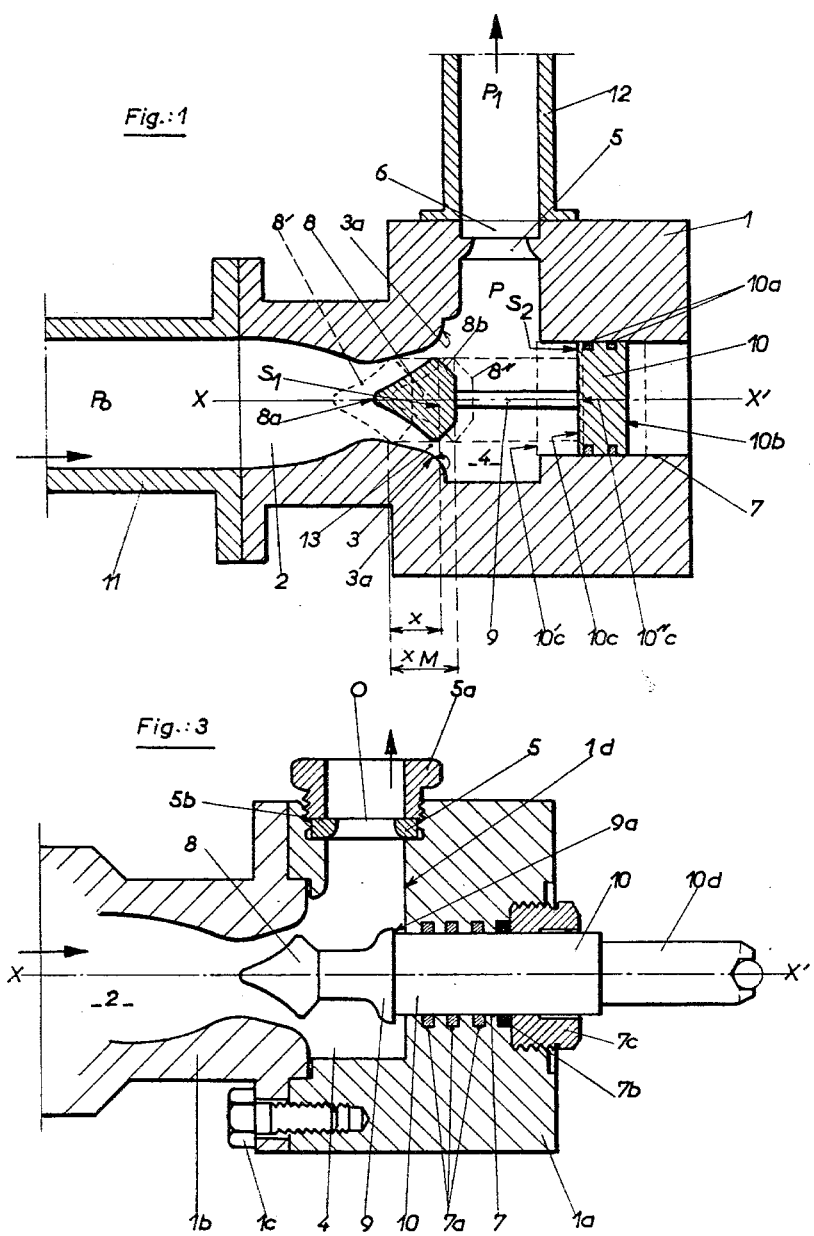
Figure 2:
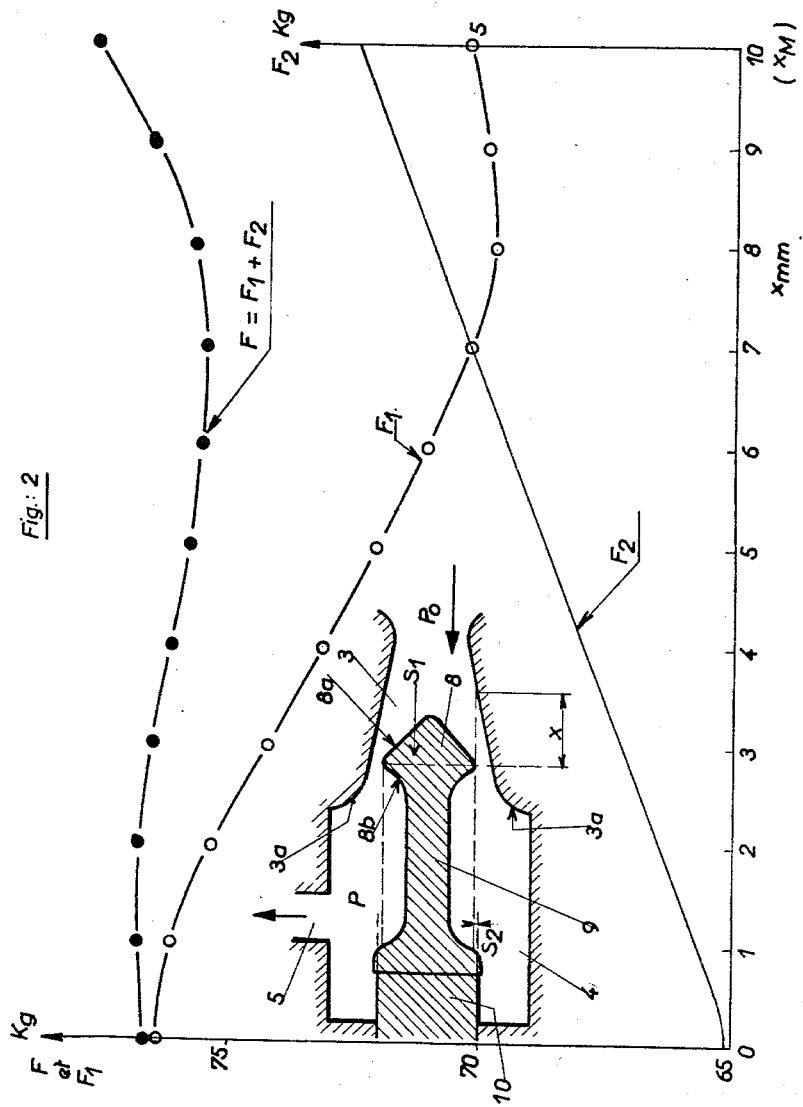
Figure 4:
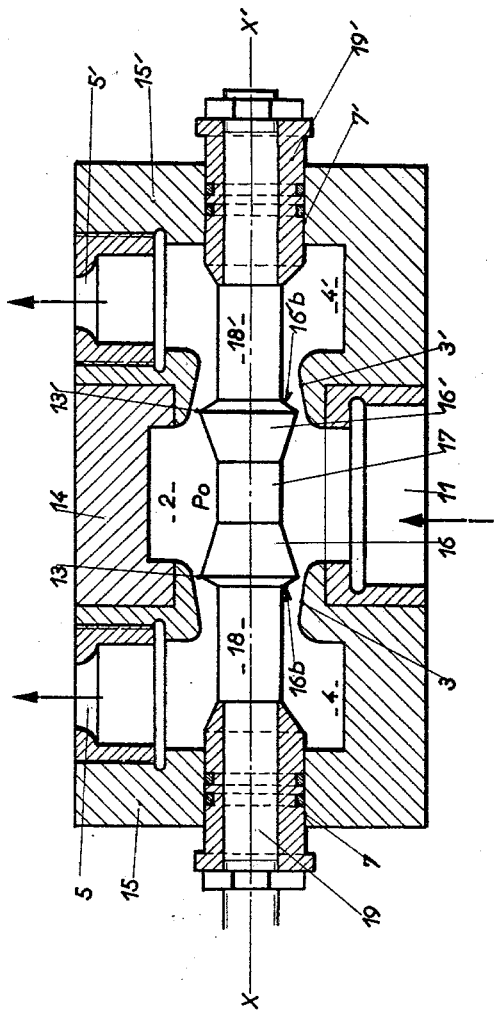

Referring now to the drawings filed herewith:
FIGURE 1 is a schematic sectional view of a valve unit executed according to the invention.
FIGURE 2 is a graph in which variation in the resultant of the forces applied to the valve and the piston is plotted against degree of opening of the valve unit illustrated schematically thereon.
FIGURE 3 is an axial sectional view of an embodiment of the valve unit in FIGURE 1.
FIGURE 4 is a schematic illustration of an arrangement used for a distributor valve.

Referring first to FIGURE 1, there is shown thereon a valve unit comprising a body 1 which encloses an internal cavity consisting of an inlet chamber 2 which communicates through a divergent nozzle 3 with an intermediate space 4, which space itself communicates, through a bored disc or similar restrictor means providing a determinate constriction in the outlet cross-section, with an outlet chamber 6. In that wall of the valve unit body 1 which is remote from the inlet chamber 2 is provided a cylindrical bore 7 the axis $xx'$ of which is common to chamber 2 and nozzle 3. The internal cavity of the valve unit body contains a mobile unit or movable valve means having an axis $xx'$ and comprising a valve 8 which is connected by a rod 9 to a piston 10. Said mobile unit is guided by any convenient means well-known per se (not shown), in such manner as to be translatable parallel to its axis $xx'$, with the piston 10 sliding within cylinder 7 and the valve shifting between a position 8' wherein it seats against the wall of nozzle 3 and thus seals off communication between inlet chamber 2 and intermediate space 4, and a position 8" wherein this passageway is open to the maximum. Piston 10 is provided with convenient sealing devices such as piston rings 10a.

The inlet chamber 2 is connected to an incoming-gas pipe 11 and the outlet chamber 3 to an outgoing-gas pipe 12. When the valve 8 moves away from its closing position 8', through a distance $x$ included between zero and its maximum value $x_M$, the gas arriving through the pipe 11 with a pressure $P_0$ flows out from the inlet chamber 2 into the intermediate chamber 4, via the throat 13 comprised between the valve 8 and the wall of nozzle 3. This gas emerges from intermediate space 4 into the pipe 12, via the bored disc 5. A total pressure P is established in the intermediate space 4. By causing the mobile unit 8, 9, 10 to so shift that valve 8 be moved from position 8' to position 8" (i.e. by causing the abscissa $x$ of valve 8 to change from zero to its maximum value $x_M$), the section S of throat 13 is caused to vary between zero and a maximum value, which in turn causes the gas mass flow per unit time Q through the valve unit to vary from zero to a maximum value. From the explanation given hereinafter it will be seen how it is possible to design a valve unit which ensures the desired relationship, in accordance with a preset law, between the mass flow per unit time Q and the valve abscissa $x$ (which abscissa $x$ determines the degree of opening of the valve).

The variation in the abscissa $x$ produces an attendant variation in the thrust exerted against the valve 8 by the gas issuing from the inlet chamber 2 into the intermediate space 4, and also in the total pressure P prevailing in said space 4. This pressure exerts upon piston 10 a thrust which combines with that exerted on the valve 8, as explained precedingly, so that the mobile unit 8, 9, 10 is subjected to a force directed rightwardly and termed the recoil force. It will be seen hereinafter that it is possible to design a valve unit such that this recoil force remains constant or substantially constant regardless of the value of $x$, and that this recoil force can be balanced by any convenient means, for instance by a constant pressure applied against the piston face 10b or by a mechanical force applied to the piston 10.

It is to be noted that the valve unit hereinbefore described is of the poppet valve type, usable for gas at high pressure and high temperature. It will of course be understood, however, that its use is by no means confined to high temperatures and high pressures.

For the valve unit to perform its function satisfactorily, it is essential that no passageway section smaller than the section of the restrictor means 5 exists in the outgoing pipe 12, or downstream thereof. In practice, this restrictor means, e.g., the bored disc 5 is so chosen that its section 6 be less than the smallest passageway section in the load circuit 12.

This being so, if S be the passageway section through the throat 13 positioned between the nozzle 3 and the valve 8 (said section being a known function of the abscissa $x$, which function is defined by the geometry of nozzle 3) and P the total pressure in the intermediate space 4, then the mass flow per unit time Q through the valve unit will be a function:

(For passage through the throat 13): of the section 2, of the upstream pressure $P_0$ and of the upstream temperature; in subsonic flows, it will also depend upon the intermediate pressure P;

(For passage through the bored disc 5 of fixed constricted section 0): of the intermediate pressure P and of the temperature of the gas in the intermediate space 4; in subsonic flows it also depends upon the downstream or utilization pressure $P_1$.

The temperatures are imposed and vary only slightly. This likewise applies to the upstream pressure $P_0$. The mass flow per unit time Q is thus a function principally of the section S, which is in turn a function of $x$ (by reason of the first condition specified above), whence it is possible to find the intermediate pressure P (by reason of the second condition specified above). Thus if the choice of the law of variation of the mass flow per unit time Q in terms of $x$ is made an arbitrary one, it will also determine the law of variation of the pressure P. One may write:

$$Q = f(x) \quad (1)$$
$$P = g(x) \quad (2)$$

For small values of $x$, 13 constitutes a sonic throat and its section S alone governs the rate of flow. Knowing the relation (1) above, which is set arbitrarily, it is possible to determine the law linking S with the abscissa $x$ and therefore also the geometry of the valve unit.

When 13 is no longer a sonic throat, it is possible to determine the law linking its section S with the abscissa $x$ by an artifice which consists in providing a sudden widening the gas passageway downstream of 13, thereby avoiding a recompression in the intermediate space 4. This sudden widening is obtained by strongly inclining to the axis $xx'$ the substantially frusto-conical face $8b$ of the valve 8 located downstream of throat 13. Under subsonic conditions, this sudden widening will not recover the dynamic pressure at the throat 13, said dynamic pressure being lost in eddies, and the static pressure at the throat 13 will be equal to the pressure P in the intermediate space 4. The Mach number M in the throat 13 may be deduced from the ratio $P/P_0$, from said Saint-Venant's Law. Knowing the section S of the throat 13, the speed of sound $c$ and the specific weight $p$ of the gas, the rate of flow per unit time Q is given in terms of the Mach number M by the formula:

$$Q = p.S.M.c \quad (3)$$

In the case that is considered, wherein 13 is no longer a sonic throat, the relations (3) and (2) further enable determination of the law linking the section S of throat 13 with the abscissa $x$ of valve 8 and consequent definition of the geometry of a valve unit capable of regulating the mass flow per unit time Q in obedience to a predetermined law as expressed by relation (1).

The object of compensating the valve is to obtain, over the entire stroke of piston 10, a constant recoil force proportional to $P_0$, which can furthermore be balanced by a counter-pressure equal or proportional to $P_0$. By recoil force should be understood the resultant of the actions exerted by the gas passing through the valve unit on the mobile element consisting of the valve 8, the rod 9 and the piston 10, when the rear face $10b$ of piston 10 is subjected to atmospheric pressure.

The action $F_1(x)$ on valve 8 of the gas flowing through the valve unit can be determined by calculation, by virtue of an important feature of this invention which consists in supplementing the flow configuration (which, as already seen, comprises a sudden downstream divergence) with a subsonic convergence upstream of the throat 13. By the incorporation of this feature, the throat 13 provides the aerodynamic flow geometry under subsonic and sonic conditions alike a condition essential to simple and precise design. The integral of the pressure exerted on the upstream face $8a$ of valve 8, which can thus be determined by calculation in terms of the abscissa $x$, is in fact the action $F_1(x)$ exerted by the gas on the valve 8.

The thrust $F_2(x)$ exerted by the gas on the front face $10c$ of piston 10 is the product of the pressure P times the section $S_2$, which section is the difference between the total section of face $10c$ and the section $S_1$ of valve 8. The thrust $F_2(x)$ will be positive (directed downstream) or negative (directed upstream) accordingly as the total section of the piston face $10c$ is greater or less than the section $S_1$ of valve 8. The relation (2) above gives the law $P = g(x)$ linking the pressure P with the valve abscissa $x$. The thrust $F_2(x)$ is of identical form, but its magnitude and its sense can be adjusted by modifying the diameter of piston 10. This diameter is determined so that the recoil force, the value of which is given by $$F(x) = F_1(x) + F_2(x)$$

be constant, or at any rate vary as little as possible.

Reference is now had to FIGURE 2, which shows an example of control force compensation of this type. In the graph, the abscissa represents the value of $x$ in millimetres and the ordinate of the values of the forces $F_1$, $F_2$ and F in kilograms. On the left-hand side of the figure, between the curves showing the variations of $F_1$ and $F_2$ in terms of $x$, a representation is given of the valve geometry corresponding to these curves, the main component parts of this valve bearing the same reference numerals as FIGURE 1. The section $S_1$ of valve 8 is 2.55 cm.$^2$, the section $S_2$ (difference between the total piston section and $S_1$) is 0.25 cm.$^2$, and the upstream pressure $P_0$ is 30 kg./cm.$^2$. The section 0 of orifice 5 has been chosen to provide a sonic throat as soon as the mass flow per unit time Q reaches an appreciable figure, namely as soon as $x$ reaches 0.3 mm. Under such conditions, the mass flow per unit time Q will be a linear function of $x$, as will also the pressure P and hence the thrust $F_2$ exerted by that pressure against the portion $S_2$ of the section of piston 10. The value $S_2$ of this portion of the section (namely 0.25 cm.$^2$) has been chosen so that the gradient of the straight line $F_2$ substantially compensates the downslope of curve $F_1$, whereby the recoil force $F = F_1 + F_2$ varies very slightly in terms of $x$.

It is necessary in practice that 5 becomes a sonic throat very rapidly, for in that case the law $F_2(x)$ is a single straight line, whereas otherwise it resolves into a family of curves dependent upon $P_0$ or the downstream pressure thereby making equilibrium possible only for determinate values of these pressures.

Referring now to FIGURE 3, there is shown thereon an embodiment of the valve unit illustrated schematically in FIGURE 1. In this specific embodiment, the nozzle 2 is bounded by a body $1b$ distinct from the main valve body $1a$, to which it is secured by screw $1c$. A threaded ring $5a$ retains the bored disc 5 at the bottom of a tapped hole $5b$ drilled into the valve body $1b$, and said bored disc leads into the intermediate space 4. The rod 9 connecting valve 8 to piston 10 is provided with a flange $9a$ which butts against the inner wall $1d$ of the body $1a$ in order to restrict the degree of opening of the valve. The piston 10 is of the plunger type and is retained in the bore 7 by a threaded ring $7c$ which tightens onto an O-ring $7b$, the interface between the piston and the bore being further pressureproofed by means of a labyrinth seal $7a$. The bore 7 is of sufficient length to ensure that, in cooperation with ring $7c$, the piston 10 carrying the rod 9 and the valve 8 is maintained aligned along the axis $xx'$. The sliding motion of piston 10 in bore 7 and ring $7c$ is controlled by a rod $10d$.

In this embodiment, the recoil force F of the mobile element 8, 9, 10 a force proportional to $P_0$ but constant whatever may be the relative position of the valve body and mobile elements is balanced mechanically by a constant force exerted through the medium of rod $10d$. Such balancing may alternatively be obtained by applying against the rear piston face a hydraulic or pneumatic pressure equal or proportional to $P_0$.

FIGURE 4 is a schematic illustration of a balanced twin distributor valve. Designed along the same lines as the one-way valve in FIGURE 1, this distributor valve enables a flow to be distributed between two conduits in accordance with a predetermined law, in terms of the degree of opening of the valve. It also makes it possible to achieve unconditional equilibrium of the piston since the thrusts against the two symmetrical half-valves are equal and opposite throughout the piston stroke.

In the specific embodiment shown in FIGURE 4, the distributor valve ensures a constant sum of the downstream pressures and a constant total mass flow per unit time. The central body 14 bounds an inlet chamber 2 which is supplied at a pressure $P_0$ through a feed gate 11. On either side of central body 14 are secured the lateral bodies 15 and 15' which bound the intermediate spaces 4 and 4' and the nozzles 3 and 3', and which comprise bores 7 and 7' aligned upon the common axis $xx'$ and outlet discs 5 and 5'. The sliding unit comprises two valves 16 and 16' which are interconnected by the central rod 17, the valve 16 being connected by rod 18 to the piston 19 sliding within bore 7 and the valve 16' being connected by rod 18' to the piston 19' sliding within bore 7'.

The gas arriving through the gate 11 into the chamber 2 is divided into two flows, of which one streams via the space 4 through the bored disc 5 and the other via the space 4' through the disc 5'. As stated precedingly with reference to FIGURE 1, the law governing the rates of flow may be chosen arbitrarily and has here been so chosen that the sum of the rates of flow of the two streams be constant, thereby making it possible to determine the geometry of nozzles 3 and 3' by the method hereinbefore described. The sum of the pressures prevailing in the two intermediate spaces 4 and 4' is likewise constant.

It will be noted that, in this specific distributor valve layout, the nozzles 3 and 3' are convergent; however, they could alternatively be divergent. The two perfectly symmetrical halves of the distributor valve are constructed like the one-way valve of FIGURE 1 and their design features determined in the same way. The recoil force applied to the half-mobile-element 16, 18, 19 is balanced by the opposite recoil force applied to the half-mobile-element 16', 18', 19'.

Since the valve is balanced, the control force required is determined only by the inherent friction, thereby restricting the power absorbed and enabling high operating speeds to be achieved. The position of the valve may be slaved to a parameter connected with the mass flow per unit time. The valve may be operated through the medium of its rod, hydraulically or pneumatically.

What is claimed is:

1. A valve unit adapted to control the flow rate of gas under pressure comprising, in combination, a valve body which forms an inlet duct of tapering cross-section, an outlet duct laterally disposed with respect to said inlet duct, means in said outlet duct forming a sonic throat, an axially movable valve means comprising a valve head and a compensating piston axially spaced apart and supported on a control rod, said valve means being axially movable towards and away from said inlet duct, said valve head comprising respective upstream and downstream sides, said compensating piston comprising an effective pressure area facing the downstream side of said head, the downstream side of said head comprising an effective pressure area smaller than and facing said area on said piston, said valve head forming with said tapering cross-section duct a variable convergent nozzle extended downstream by a sudden widening, said nozzle being a sonic nozzle when said valve head is at the beginning of its axial movement away from said tapering cross-section duct, the upstream and downstream effective pressure areas on said valve head being so proportioned relative to the effective pressure area on said piston that for all axial positions of said valve means relative to said inlet duct, the total force acting against said valve means in an axial direction away from said inlet duct remains constant.

2. A valve unit according to claim 1, wherein said valve head has a conical upstream end and a reverse conical downstream end, said inlet duct having a convergent-divergent configuration, said variable nozzle being formed between said valve head and said divergent part of said inlet duct, said divergent part also having a conical shape whereby said variable nozzle has a linear variation with respect to the axial displacement of said valve means.

3. The valve unit of claim 1, wherein said valve body includes two of said inlet ducts each being coaxial with the other and branching laterally from a central feed gate and a separate one of said outlet ducts for each inlet duct, said axially movable valve means comprising a said valve head and a said compensating piston for each of said inlet ducts, both said valve heads and both said pistons being supported on a common said control rod and being axially movable together, whereby when one of said valve heads moves away from its associated inlet duct, the other of said valve heads moves towards its associated inlet duct.

4. A valve unit according to claim 3 wherein the rate of section variation of the two variable nozzles constituted respectively by an inlet duct and the associated valve head, which vary with respect to the common control rod displacement, is so calculated as to distribute an inlet total flow of constant rate by either of said outlet ducts, the sum of the pressure values between each valve head and the corresponding passage of restricted outlet section being consequently constant.

References Cited by the Examiner

UNITED STATES PATENTS

| | | | |
|---|---|---|---|
| Re. 24,410 | 12/57 | Drake | 137—100 |
| 2,621,676 | 12/52 | Loft | 251—282 XR |
| 2,843,351 | 7/58 | Griest | 251—282 XR |
| 2,912,010 | 11/59 | Evans | 251—282 XR |
| 2,970,806 | 2/61 | Rexford | 251—282 XR |

FOREIGN PATENTS 720,559   12/54   Great Britain.

M. CARY NELSON, *Primary Examiner.*

ISADOR WEIL, *Examiner.*